Patented Nov. 14, 1922.

1,435,187

UNITED STATES PATENT OFFICE.

ARTHUR STOLL, OF BASEL, SWITZERLAND, ASSIGNOR TO CHEMICAL WORKS FORMERLY SANDOZ, OF BASEL, SWITZERLAND.

SALTS OF ERGOTAMINE AND PROCESS OF MAKING SAME.

No Drawing. Application filed October 12, 1921. Serial No. 507,369.

*To all whom it may concern:*

Be it known that I, ARTHUR STOLL, a citizen of the Swiss Republic, and resident of Basel, Switzerland, have invented New Salts of Ergotamine and a Process of Making Same, of which the following is a full, clear, and exact specification.

In my U. S. Letters Patent No. 1394233, dated October 18, 1921, I have described the process for the preparation of the highly active main alkaloid of ergot, which has since been designated in the chemical and medicinal literature by the scientific name of "ergotamine" (see Actes de la Société Helvétique des Sciences Naturelles, II° partie, pp. 190 and 235 and Schweiz. Med. Wochenschrift, 1921, No. 23). This alkaloid known at first by the above mentioned process is, in the form of its free base, very difficultly soluble in water and therefore unadapted in this form for therapeutical application, namely for parental administration. I have now found, that the very feeble base "ergotamine" has nevertheless sufficiently strong basic properties to form with the various organic and inorganic acids salts more easily soluble in water than the ergotamine base itself and showing an acid reaction with litmus. In spite of the sensitiveness of ergotamine, I succeeded, as described thereafter, by working cautiously, in the preparation of the hitherto unknown salts of ergotamine as well in a solid and crystalline form as in stable aqueous solutions of concentrations sufficient for the medicinal application of the alkaloid. As parent material may be employed either the pure base in the form it crystallizes from aqueous acetone or an ergotamine rich alkaloid product and the formation of the salt can be used in this latter case for separating the ergotamine from the impurities.

The process for the preparation of ergotamine salts is based upon the action of a sufficient quantity of an acid on the free ergotamine base.

In order to prepare the ergotamine salts in a solid crystalline form, the free base is advantageously dissolved in indifferent organic solvents mixable with water, as for instance ethyl alcohol, methyl alcohol, acetone, and the acid is added to the solution thus obtained, whereby in many cases the separation of the corresponding crystalline salts occurs immediately. Owing to the weakly basic nature of the ergotamine, the acid salts of ergotamine prepared with an excess of acid are transformed easily into salts containing less acid. The salts containing the least acid are obtained by adding cautiously the acid to a solution of ergotamine in organic solvents not mixable with water, as for instance, ether, chloroform, benzene, as long as a precipitate is produced, and recrystallizing the amorphous precipitate from a convenient solvent, as for instance methyl alcohol. A characteristical feature of the ergotamine salts in their tendency to form with organic solvents, as for instance methyl alcohol or ethyl alcohol, crystallized bodies, which solvents they retain often with great obstinacy.

For the preparation of ergotamine salts, in the form of pure aqueous solutions or of aqueous solutions to which alcohol and glycerin were added as preservative agents, a sufficient quantity of acid is added to the solvent and to the dilute acid thus obtained is added a concentrated solution of the ergotamine base in an organic solvent as for instance alcohol. According to this operating method, it is possible to obtain even with water containing carbonic acid an aqueous solution of ergotamine of a concentration sufficient for a parenteral administration of the alkaloid.

Like the free base, the ergotamine salts and their solutions are altered namely in the light by oxygen, while being colored to yellow and brown by oxidation. This is avoided, by preventing the access of air during the preparation and the preservation of ergotamine salts and of their solutions, particularly when preparing and filling in injection solutions with the employ of gases free of oxygen, as for instance nitrogen and carbone dioxide.

*Example I.*

1.25 gr. of the combination of ergotamine with acetone and water, corresponding to 1 gr. of base free of crystallization solvent, are dissolved in 8 ccm. of absolute alcohol and to the resulting solution are added 0.085 gr. of sulfuric acid in 1½ ccm. of absolute alcohol. The ergotamine sulfate thus formed separates after a short standing in the cold; very quickly in the form of large rhombic leaflets, which after they have been subjected to a suction, loss 13.7 per cent of the crystallization solvent, when dried in vacuo, and show then a content of 7.56 per cent of $H_2SO_4$.

When working in an analogous manner, but employing a larger quantity of acid, namely 27 ccm. of aqueous half normal $H_2SO_4$ for 2 gr. of ergotamine base, there crystallizes from methylalcohol a sulfate which, dried to weight constancy in a vacuum, shows the $1\frac{1}{2}$ fold content of $H_2SO_4$ (10.36%). This also well crystallized salt is transformed, when recrystallized, into the ergotamine sulfate of the preceding essay and contains after elimination of the crystallization solvent 7.68% of $H_2SO_4$.

*Example II.*

5 gr. of ergotamine base are dissolved in 30 ccm. of chloroform and shaken with a gradually increased quantity of dilute hydrochloric acid until a precipitation of a flocky ergotamine hydrochloride takes place. The separation from the aqueous layer is completed by adding sodium chloride. The salt separated by filtration is dried and recrystallized from methylalcohol. The ergotamine hydrochloride crystallizing in form of thin prisms loses 5 per cent of its weight, when dried for 60 hours in vacuo, over phosphorus pentoxide, and shows only a weight constancy after it has been dried for several hours in a high vacuum at 56° C., its content of hydrochlorine being then 5.85 per cent.

*Example III.*

Into a boiling solution of 3.5 gr. of tartaric acid in 100 ccm. of absolute alcohol is poured a filtered solution of 15 gr. of raw ergotamine obtained according to the U. S. Letters Patent No. 1394233, dated October 18, 1921, in 100 ccm. absolute alcohol. After some standing and cooling, the liquid is filtered off from ergotamine tartrate which separates in form of compact prisms mostly arranged in the form of radiating bunches. It loses its crystallizing medium only incompletely when dried for several days, in the cold, even in a high vacuum, over phosphorus pentoxide. The nitrogen determination according to Kjeldahl gives, after a long heating of the finally difficultly destructible substance, the content of 9.3 per cent corresponding to an acid tartrate.

*Example IV.*

2.5 gr. of ergotamine-acetone crystals corresponding to 2 gr. of base free of acetone are dissolved in 30 ccm. of methylalcohol and to the resulting solution are added 0.47 gr. of salicylic acid. An abundant crystallization of the salicylate begins immediately, in the form of well formed, opalescent leaflets of triangular or trapezoidal shape, which are often grouped by one angle to radiating bunches. After a standing for several hours in the cold the mass is filtered off and slightly washed with methyl alcohol and some ether. After the ether has been separated by suction the substance loses by its drying to weight constancy about 10 per cent of the crystallization medium and shows a nitrogen content of 9.7 per cent.

*Example V.*

For the preparation of the ergotamine citrate in solid form, 1.25 gr. of the ergotamine-acetone compound corresponding to 1 gr. of free base are dissolved in 10 ccm. methylalcohol; the resulting solution is slightly heated and 0.186 gr. of aqueous citric acid dissolved in some methyl alcohol are added thereto. After addition of 1 ccm. of water the citrate crystallizes, while the mass is slowly cooled, in small lustrous prisms grouped to druses, which, when dried to weight constancy, show a loss of crystallization agent of about 12 per cent of their weight, their nitrogen content being then of 10.4 per cent corresponding to a salt composed of 2 molecules of ergotamine for 1 mol. of citric acid.

For the preparation of ergotamine citrate in solution, 1 gr. of ergotamine is dissolved in 50 ccm. of alcohol and to the solution obtained there are added 950 ccm. of a 0.7 per cent common salt solution containing 0.39 gr. of dissolved citric acid, whereby a solution containing water-clear alkaloid solution of 1 per thousand is produced. By leading nitrogen through the solution and preserving it under the said gas free of oxygen, any yellow coloring of the solution, which occurs easily in the air and particularly in the light, is prevented. A neutralizing of the solution with alkali produces a precipitate of the base which is again dissolved in an excess of alkali.

*Example VI.*

0.5 gr. of ergotamine are dissolved in 10 ccm. of absolute alcohol and the solution obtained is added to 1 liter of a physiological solution of common salt, saturated with carbonic acid. In this manner there is obtained a clear aqueous solution, in which the carbonic acid maintains on the one hand the ergotamine in solution and preserves it on the other hand from oxidation by the oxygen of the air. By driving off the carbonic acid the base precipitates nearly completely in form of flocks which are dissolved again, by leading the gas through the suspension.

What I claim is:

1. The herein described salts of ergotamine, which are more easily soluble in water than the free base and react acid with litmus, crystallize from indifferent organic solvents mixable with water, showing the tendency to form crystallized compounds with organic solvents, which they retain often with obstinacy, and undergoing easily like the free base under the action of oxygen of the air, particularly in the light, oxidative changes while coloring themselves yellow and brown.

2. The herein described process for the manufacture of ergotamine salts, consisting in reacting with an acid on free ergotamine base.

3. The herein described process for the manufacture of ergotamine salts in solid crystalline form, consisting in dissolving the free ergotamine base in indifferent organic solvents mixable with water and producing afterwards by adding an acid the crystalline separation of the corresponding salt.

4. The herein described process for the manufacture of ergotamine salts in aqueous solution, consisting in adding an acid to water and adding to the acid so diluted a concentrated solution of ergotamine in an organic solvent.

5. The herein described process for the manufacture of ergotamine salts consisting in reacting on free ergotamine base with an acid in an atmosphere free of oxygen in order to avoid any change of the ergotamine substance by oxidation.

6. As a new article of manufacture, a crystallized ergotamine salt easily soluble in water and preserved against the contact of the oxygen of air.

7. As a new article of manufacture, the herein described crystallized ergotamine acid tartrate, easily soluble in water and preserved against the contact of the oxygen of air.

In witness whereof I have hereunto signed my name this 27th day of September, 1921, in the presence of two subscribing witnesses.

ARTHUR STOLL.

Witnesses:
 FRIDA KURZ,
 AMAND RITTER.